(12) United States Patent
Andelin et al.

(10) Patent No.: US 10,365,161 B2
(45) Date of Patent: Jul. 30, 2019

(54) BEAM ALIGNMENT

(71) Applicant: FFE Limited, Hertfordshire (GB)

(72) Inventors: Jacob Andelin, Hertfordshire (GB); Gareth Dibden, Hertfordshire (GB); Marcus Perch, Hertfordshire (GB)

(73) Assignee: FFE LIMITED (GB)

( * ) Notice: Subject to any disclaimer, the term of this patent is extended or adjusted under 35 U.S.C. 154(b) by 1 day.

(21) Appl. No.: 15/624,088

(22) Filed: Jun. 15, 2017

(65) Prior Publication Data

US 2017/0363476 A1   Dec. 21, 2017

(51) Int. Cl.
| | |
|---|---|
| *G01N 21/17* | (2006.01) |
| *G01J 5/08* | (2006.01) |
| *G08B 17/103* | (2006.01) |
| *G08B 29/20* | (2006.01) |
| *G01B 11/24* | (2006.01) |
| *G01J 5/00* | (2006.01) |
| *G08B 17/10* | (2006.01) |
| *G08B 29/18* | (2006.01) |

(52) U.S. Cl.
CPC ............ *G01J 5/0896* (2013.01); *G01B 11/24* (2013.01); *G01J 5/0803* (2013.01); *G08B 17/103* (2013.01); *G08B 29/20* (2013.01); *G01J 2005/0048* (2013.01); *G08B 17/10* (2013.01); *G08B 29/18* (2013.01)

(58) Field of Classification Search
CPC ... H04N 5/33; G01J 5/522; G01T 1/40; A61B 6/583; G01D 18/00
See application file for complete search history.

(56) References Cited

U.S. PATENT DOCUMENTS

| 5,085,508 A | 2/1992 | Hawkinson |
| 2008/0316039 A1 | 12/2008 | White et al. |
| 2010/0044549 A1 | 2/2010 | Bibo et al. |
| (Continued) | | |

FOREIGN PATENT DOCUMENTS

| DE | 102007021677 A1 | 11/2008 |
| EP | 2 343 498 A1 | 7/2011 |
| (Continued) | | |

OTHER PUBLICATIONS

European Search Report from Application No. EP 17 17 6313 dated Nov. 20, 2017.

(Continued)

*Primary Examiner* — David P Porta
*Assistant Examiner* — Mamadou Faye
(74) *Attorney, Agent, or Firm* — RatnerPrestia

(57) ABSTRACT

A method for aligning a projected beam on a reflector in a reflective-type beam detector, the method including adjusting the projected beam so as to: project on to substantially all, if not all, of a reflective surface of the reflector; or project on to at least a portion of a reflective surface of the reflector until a constant, or within a predetermined threshold of a constant, signal is received from the reflector; and detecting one or more edges of the reflective surface of the reflector and thereby: centering the projected beam, so as to align an approximate center of the projected beam on, or within a predetermined threshold of, an approximate center of the reflective surface of the reflector; and/or determining a shape or profile of the reflector.

17 Claims, 3 Drawing Sheets

(56) References Cited

U.S. PATENT DOCUMENTS

| | | | | |
|---|---|---|---|---|
| 2015/0241330 A1* | 8/2015 | Knox | .................... | G01N 15/06 |
| | | | | 356/338 |
| 2015/0374227 A1* | 12/2015 | Takeno | ................. | A61B 3/102 |
| | | | | 600/425 |
| 2016/0238709 A1* | 8/2016 | Lang | ....................... | G01S 17/88 |

FOREIGN PATENT DOCUMENTS

| | | |
|---|---|---|
| GB | 2 414 549 A | 11/2005 |
| GB | 2426323 A | 11/2006 |
| GB | 2450132 A | 12/2008 |

OTHER PUBLICATIONS

Great Britain Combined Search and Examination Report for Great Britain Application No. GB1610488.7, dated Nov. 11, 2016—5 Pages.
Great Britain Supplementary Combined Search and Examination Report for Great Britain Application No. GB1610488.4, dated Feb. 27, 2017—3 Pages.

\* cited by examiner

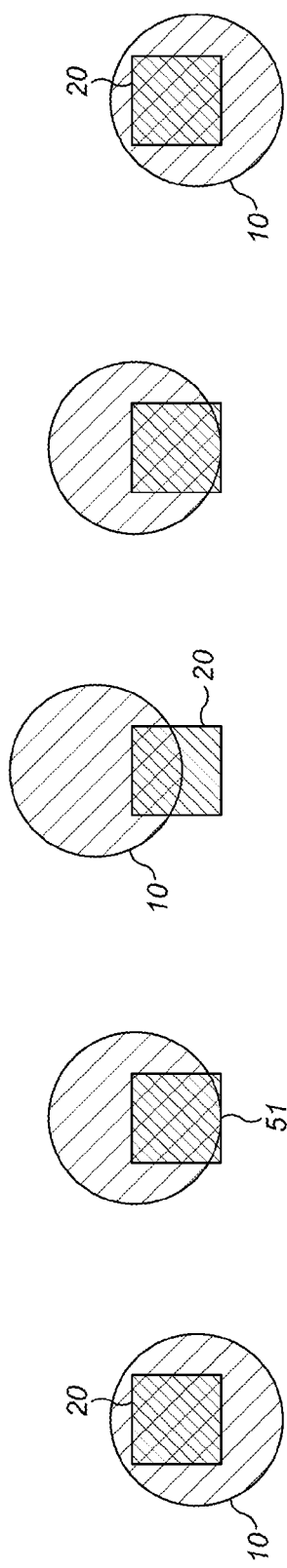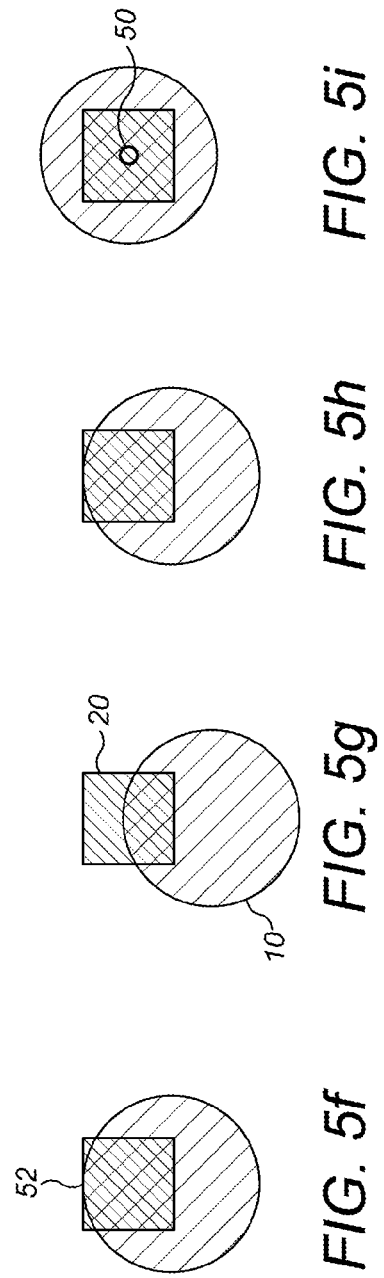

BEAM ALIGNMENT

CROSS-REFERENCE TO RELATED APPLICATION

This patent application claims priority from UK Patent Application No. GB1610488.7, filed the 16 Jun. 2016, the disclosure of which is incorporated by reference herein in its entirety.

FIELD OF THE INVENTION

The present invention relates to beam alignment. In particular, the invention relates to a method for aligning a projected beam on a reflector in a reflective-type beam detector, a method for searching for and projecting a beam on to a reflector in a reflective-type beam detector, and apparatus associated with the methods.

BACKGROUND OF THE INVENTION

In summary, a reflective optical beam smoke detector system has a detector unit, which includes both a transmitter and a receiver, and a retro-reflector. The detector unit and the reflector are placed opposite each other at opposing ends of a volume to be protected and monitored. The transmitter projects a beam, in this example an Infrared (IR) beam, on to the retro-reflector which reflects the IR beam along the same axis back to the receiver. Smoke in the beam path will reduce the amount of light returning to the receiver. The receiver continuously monitors the amount of light received and, if it drops below a certain user-defined threshold, then an alarm is initiated.

In normal circumstances (i.e. when no smoke is present), correct operation of the system relies upon stability of the amount of light being returned from the retro-reflector, as the receiver struggles to distinguish between a reduction in the level of light caused by the presence of smoke, and that caused by other factors, for example typical environmental movement of a building which can affect alignment of the system. The best (and only) way to improve stability is to correctly align the light beam on to the retro-reflector during initial installation.

Manual alignment can be a slow and drawn-out process, and it is surprisingly easy, even for professionals using this method, to achieve the wrong alignment—for instance, alignment with a reflective object which is not the reflector per se. Laser targeting—illumination of the reflector with a visible laser—has led to a reduction in wrong alignment; however, alignment of the laser on the reflector is no guarantee of alignment of the transmitter and the reflector, and the reflector and the receiver.

As such, there is a need for a more efficient and effective alignment procedure. Further, there is a need for an automated alignment procedure. The present invention is aimed at providing such improved procedures.

SUMMARY OF INVENTION

According to a first aspect, the present invention provides a method for aligning a projected beam on a reflector in a reflective-type beam detector, the method comprising:
  adjusting the projected beam so as to:
    project on to substantially all, if not all, of a reflective surface of the reflector; or
    project on to at least a portion of a reflective surface of the reflector until a constant, or within a predetermined threshold of a constant, signal is received from the reflector; and
  detecting one or more edges of the reflective surface of the reflector and thereby:
    centering the projected beam, so as to align an approx. centre of the projected beam on, or within a predetermined threshold of, an approx. centre of the reflective surface of the reflector; and/or
    determining a shape or profile of the reflector.

Preferably, centering the projected beam so as to align a centre of the projected beam directly on a centre of the reflective surface of the reflector.

Preferably, prior to adjusting, conducting visual targeting of the reflector, preferably using laser targeting.

Preferably, prior to adjusting, conducting a search for the reflector according to the second aspect.

Preferably, adjusting or detecting comprises a series of one or more incremental altitudinal and/or lateral movements of the projected beam. Most preferably, adjusting or detecting comprises a series of one or more incremental altitudinal and/or lateral movements of the projected beam followed by a respective series of one or more incremental lateral and/or altitudinal movements of the projected beam.

Preferably, adjusting additionally comprises adjusting transmitter power and receiver gain.

Preferably, the method additionally comprises, during adjusting or detecting, monitoring a signal received from the reflector after each incremental adjustment.

Preferably, centering comprises a series of one or more incremental altitudinal and/or lateral movements of the projected beam.

Preferably, centering comprises calculating a number of incremental movements from one edge of the reflector to an opposed edge of the reflector and determining a median.

Preferably, the method additionally comprises monitoring a signal received from the reflector after each incremental adjustment.

Most preferably, the beam detector is an optical beam smoke detector, in particular an Infrared (IR) smoke detector.

According to a second aspect, the present invention provides a method for searching for and projecting a beam on to a reflector in a reflective-type beam detector where initial illumination of the reflector has been unsuccessful, the method comprising:
  projecting the beam to a first projected location in the vicinity of the reflector and, if no signal is detected from the reflector or a signal detected is less than an operable threshold, projecting the beam either constantly or intermittently whilst tracing at least part of a circumjacent pathway around that first projected location in order to detect a location of the reflector.

Preferably, the method further comprises, whilst tracing, if a signal is detected from the reflector or any signal detected meets the operable threshold at a subsequently projected location, terminating the search as the reflector has been located.

Preferably, the method further comprises, whilst tracing, if no signal is detected or any signal less than an operable threshold is detected at a subsequently projected location, continuing tracing the circumjacent pathway or increasing the size of the circumjacent pathway.

Preferably, the circumjacent pathway incrementally increases in size upon each full trace around the first projected location. Although somewhat less preferred, the pathway could start larger and then diminish after each full trace.

Preferably, the beam is projected to a second projected location a distance x from the first projected location, from which location a first circumjacent pathway starts. Preferably, the beam is projected to a third projected location a distance y, where y>x, from the first projected location, from which location a second circumjacent pathway starts. Preferably, the beam is projected to a fourth projected location a distance z, where z>y>x, from the first projected location, from which location a third circumjacent pathway starts. Preferably, distances x and y, y and z, and/or x, y and z have a linear relationship.

Preferably, if no signal is detected from the reflector or any signal detected is less than an operable threshold, after three full traces—after the third circumjacent pathway—around the projected location, terminating the search. Terminating the search could happen after any number of full traces without locating the reflector, from, say, 2 to 10 traces.

Preferably, the circumjacent pathway is circumferential, quadrilateral, or spiral. Most preferably, the circumjacent pathway is box-like, being square or rectangular.

According to a third aspect, the present invention provides beam detector apparatus, for aligning a projected beam on a reflector, the apparatus comprising:
  adjusting apparatus for adjusting the projected beam so as to:
    project on to substantially all, if not all, of a reflective surface of a reflector; or
    project on to at least a portion of a reflective surface of a reflector until a constant, or within a predetermined threshold of a constant, signal is received from the reflector; and
  detecting apparatus for detecting one or more edges of the reflective surface of the reflector and further comprising:
    apparatus configured to centre the projected beam so as to align an approx. centre of the projected beam on, or within a predetermined threshold of, an approx. centre of the reflective surface of the reflector and/or;
    apparatus configured to determine a shape or profile of the reflector.

Preferably, the apparatus comprises one or more features according to the first aspect.

According to a fourth aspect, the present invention provides a reflective-type beam detector apparatus for searching for and projecting a beam on to a reflector, the apparatus being configured to project the beam to a first projected location in the vicinity of the reflector and, if no signal is detected from the reflector or a signal detected is less than an operable threshold, project the beam either constantly or intermittently whilst tracing at least part of a circumjacent pathway around that first projected location in order to detect a location of the reflector.

Preferably, the apparatus comprises one or more features according to the second aspect.

The present invention also relates to a data carrier, disk, microchip, computer, tablet or the like programmed to implement the method of the first aspect or the second aspect, or a piece of software stored on any such device coded to implement the method of the first aspect or the second aspect.

The present invention also relates to a method for aligning a projected beam on a reflector in a reflective-type beam detector, the method comprising:
  adjusting the projected beam so as to:
    project on to substantially all, if not all, of a reflective surface of the reflector; or
    project on to at least a portion of a reflective surface of the reflector until a constant, or tolerably constant, signal is received from the reflector; and
  centering the projected beam so as to align an approx. centre of the projected beam on, or tolerable near, an approx. centre of the reflective surface of the reflector.

Preferably, further features are defined in relation to the first aspect.

The present invention also relates to a method for searching for and projecting a beam on to a reflector in a reflective-type beam detector, the method comprising:
  projecting the beam to a first projected location in the environs of the reflector and, if no signal is detected from the reflector or a signal detected is less than an operable threshold, projecting the beam either constantly or intermittently whilst tracing at least part of a circumjacent pathway around that first projected location in order to detect a location of the reflector.

Preferably, further features are defined in relation to the second aspect.

Advantageously, alignment according to the present invention is quicker, easier and more efficient than manual alignment, and reduces the incidences of wrong alignment. No actual manual alignment of the detector unit is required. Accurate alignment of the centre of the beam to the centre of the reflector is provided. Further, by accurately aligning the centre of the beam to the centre of the reflector, there is a reduction in false alarms caused by movement of the building, this also provides long-term benefits through the life of the installation, as future problems with alignment are minimised or avoided. Advantageously, alignment also conducts a useful cross-reference so as to check that alignment is with the reflector per se and not some other reflective surface. Profiling of the reflective surface of the reflector identifies the shape of the reflective surface, and can flag if an unexpected (unsymmetrical) object is being profiled. A so-called box search provides a useful and efficient search too for locating a reflector is laser targeting has been unsuccessful or not utilised.

Beam profile is an important consideration in Infrared (IR) beam detectors, especially in reflective-type smoke detectors. This helps to ensure that efficient installation and continued stable operation can be achieved. A flat, wide beam is good at reducing susceptibility to building movement—the beam will naturally move during normal operation as the building shifts over time. If the size of the beam is large compared to the reflector, and the intensity is constant across its width, then once centred this will give the most tolerance to subsequent movement. Further, it is only when the edge of the beam reaches the edge of the reflector that the amount of reflected light is reduced. However, a wider beam is much more difficult to achieve as it disperses light much more and, hence, a more powerful transmitter is required. Conversely, a narrow beam is much more light-efficient, which means that a less powerful transmitter is needed, but the system is much more susceptible to the effects of beam movement after alignment. Accordingly, beam profile is somewhat of a play-off between the size of the illuminated area and the amount of illumination. In a situation where the illuminated area around the reflector is much larger than the reflector, the light itself is relatively dim. In a situation where the illumination is very intense and the illuminated area is essentially the same size as the reflector, there is very little tolerance to the effects of the building (and thereby the beam) moving during normal operation. In a preferred situation, a compromise, the light is of an adequate intensity and the illuminated area is still larger than the reflector. The design of the lens needs to take these factors into consideration and control the beam profile and divergence angle (which controls intensity).

With respect to 'a/the reflective surface', this term is meant to encompass all forms of reflector which will have in them at least one reflective surface, and sometimes a plurality of reflective surfaces.

BRIEF DESCRIPTION OF FIGURES

The invention will now be disclosed, by way of example only, with reference to the following drawings, in which:

FIGS. 5a to 5i are schematic drawings of a centering procedure for aligning a centre of a beam on a centre of a reflector in a reflective-type smoke detector.

DETAILED DESCRIPTION

An overall alignment process has two main steps: firstly, laser targeting of the reflector; and, secondly, an auto-align procedure. In laser targeting, a user remotely maneuvers a detector, using its internal motor, so that an integrated visible laser is pointing at the reflector. The laser is only a rough alignment guide; however, and having the laser on the reflector is no guarantee that the Infrared (IR) beam is also perfectly aligned on the reflector. The auto-align procedure is used to properly align the IR beam on the reflector and has three main steps; search; adjust; and centre. In a preferred embodiment, during the installation procedure, auto-align is automatically initiated after the user has turned off the laser.

The auto-align procedure is implemented through an algorithm (which is run by a computer), which algorithm requires a minimum signal level (i.e. a minimum amount of light returned by the reflector) for it to complete correctly. As such, the first consideration is to check the amount of light returned and, if it is below the minimum level (a threshold set in the algorithm), it will perform a search, a so-called 'box search'. Here it should be understood that 'search' is only carried out if the amount of light returned is lower than the minimum level, and is not carried out if the level of light returned reaches that minimum level.

Figure 1:
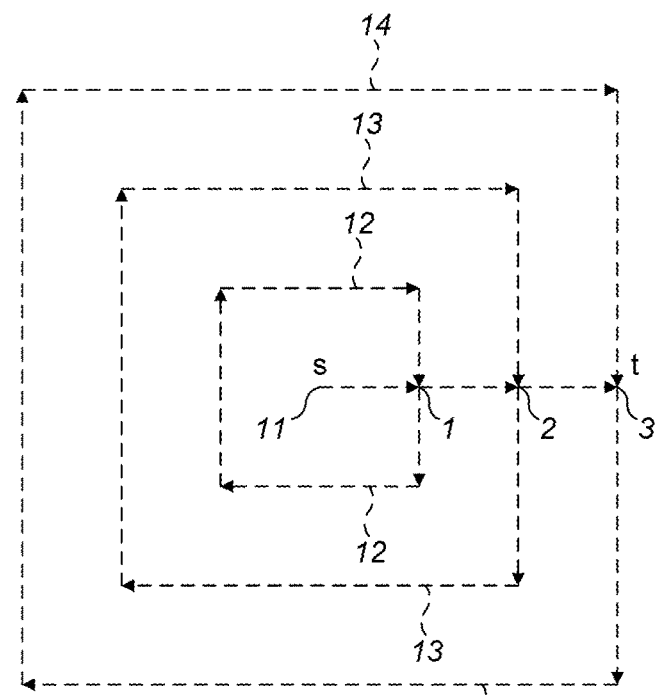
FIG. 1 is a schematic drawing of a search procedure for locating a reflector of a reflective-type smoke detector.
Figure 2:
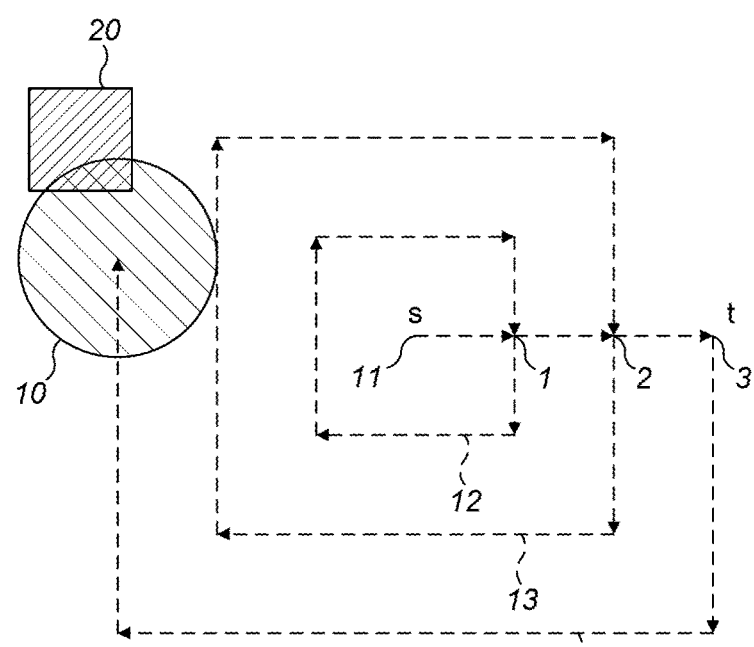
FIG. 2 is a further schematic drawing of the search procedure of FIG. 1.

FIGS. 1 and 2 graphically represent a search procedure implemented by the algorithm. In summary, this is a process by which a beam 10 is moved around in a series of increasingly sized boxes so as to locate a reflector 20. A start point of the search procedure 's', identified also by reference 11, is provided following the laser targeting step. From the start point 's', the beam is projected to a point 1, some lateral distance x—here to the right of 's' in FIGS. 1 and 2—from the start point 's', from which point 1 the beam starts to trace a first box-like pathway 12, indicated by stippled lines. In essence, the box-like pathway 12 extends down from point 1, across to the other side of 's', upwards to above 's', across from that side to the original side of 's', and downwards to point 1 again. During projection, the beam 10 is intermittently projected at approx. ten times per second.

If during this trace of pathway 12, no signal is detected or any signal detected is less than an operable threshold at a subsequently projected location around the pathway 12, when the trace reaches point 1 again, the size of the box-like pathway is increased. As such, the beam is projected to a point 2, some lateral distance y—here again to the right of 's' in FIGS. 1 and 2—from the start point 's', in which y>x, from which point 2 the beam starts to trace a second box-like pathway 13, indicated by stippled lines in the Figures. In essence, this pathway 13 has the same types of movement as per pathway 12, but is just bigger.

If during this trace of pathway 13, no signal is detected or any signal detected is less than an operable threshold at a subsequently projected location around the pathway 13, when the trace reaches point 2 again, the size of the box-like pathway is increased. As such, the beam is projected to a point 3, some distance z from the start point 's', in which z>y>x, from which the beam starts to trace a third box-like pathway 14, indicated by stippled lines in the Figures. In essence, this pathway 14 has the same types of movement as per pathways 12 and 13, but is just bigger.

As shown in FIG. 1 per se, if during this trace of pathway 14, no signal is detected or any signal detected is less than an operable threshold at a subsequently projected location around the pathway 14, when the trace reaches point 3 again—which is additionally denoted termination point 't' in that Figure—the search procedure terminates as a reflector 20 has not been located during a normal search procedure.

Of course, if during tracing around pathways 12, 13, or 14 a signal is detected or any signal detected meets the operable threshold at a subsequently projected location on the pathways 12, 13 or 14, the search is terminated as the reflector 20 has been located. FIG. 2 shows an example of this in which the beam 10 has traced pathways 12 and 13 in entirety, has started tracing around pathway 14, and locates the reflector 20 just over halfway around pathway 14.

Once 'search' has completed, 'adjust' can begin. FIGS. 3 and 4 graphically represent an adjustment procedure implemented by the algorithm. In summary, this procedure adjusts the IR beam 10 so that it is more central to the reflector 20, and adjusts the transmitter power and receiver gain so that the signal received is in the middle of the dynamic range of the receiver.

Figure 3A:
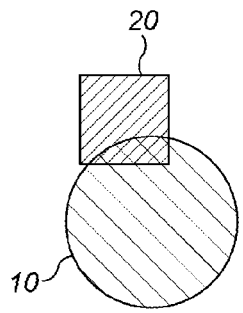
FIGS. 3a to 3f are schematic drawings of an adjustment procedure for projecting a beam on to a reflector of a reflective-type smoke detector.
Figure 3B:
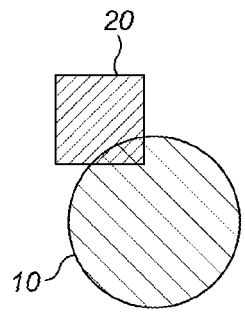
Figure 3C:
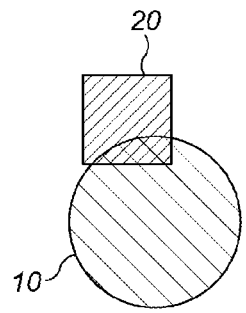
Figure 3D:
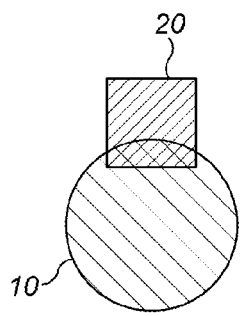
Figure 3E:
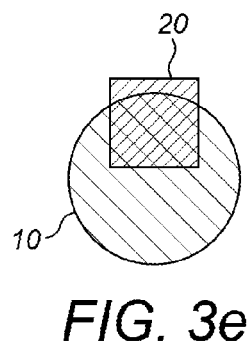
Figure 3F:
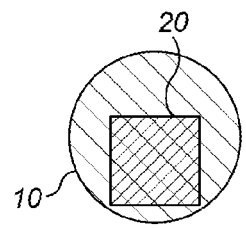
Figure 4:
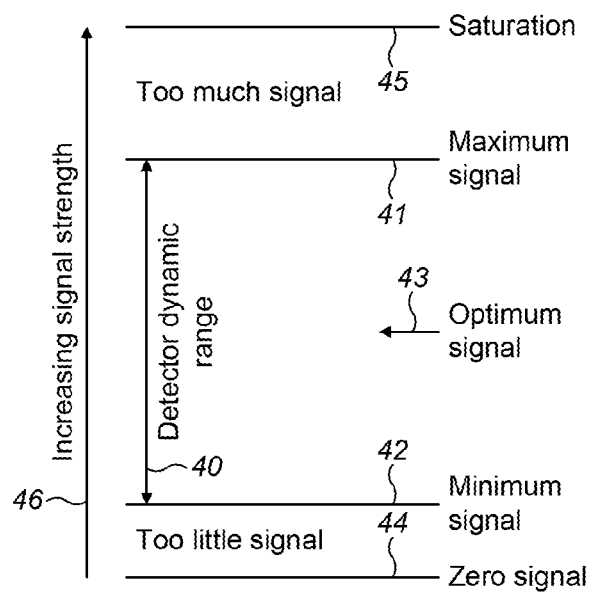
FIG. 4 is a graphical representation of an adjustment procedure relating to transmitter power and receiver gain in a reflective-type smoke detector.

FIGS. 3a to 3f show movement of the beam 10 with respect to the fixed reflector 20 during this procedure. As the beam 10 is moved from its starting position shown in FIG. 3a, the IR signal is monitored. The beam 10 moves laterally (to the right) from its position in FIG. 3a to that shown in FIG. 3b. If the signal decreases following that movement (which is to be expected as less of the beam is incident on the reflector), it will be known that the beam 10 has moved away from the centre of the reflector 20. As such, the next movement—which is from the position of the beam 10 shown in FIG. 3b to that shown in FIG. 3c—will be in the opposite lateral direction (to the left). If the signal increases (which is to be expected as more of the beam is incident on the reflector), it will be known that the beam has moved closer to the centre of the reflector 20 and the next lateral movement—which is from the position of the beam 10 shown in FIG. 3c to that of FIG. 3d—will continue in that same direction. If the signal does not change appreciably after one or more lateral movements, subsequent movements will be altitudinal, and the process is, effectively repeated in the altitudinal sense. By way of example, the beam 10 is moved attitudinally from its position in FIG. 3d to that shown in FIG. 3e, and the evaluation continues until all of the beam 10 illuminates reflector 20, as shown in FIG. 3f, which is effectively the nth movement of the beam 10.

Each of the lateral or altitudinal movements of the beam 10 are a series of one or more incremental movements. There can be a number of series of movements until the nth movement shown in FIG. 3f.

FIG. 4 represents an adjustment procedure relating to transmitter power and receiver gain and shows the dynamic range 40 of a typical detector. During adjust, and the movement of the beam as described above, the algorithm will try to keep the received signal strength in the middle of its dynamic range 40. If the signal received increases above a maximum signal 41—because the beam has been moved closer to the centre of the reflector and, therefore, more of the beam is being reflected—the gain and power are reduced so as to bring the signal back into the dynamic range 40. Conversely, if the signal drops below the minimum signal 42—because the beam has been moved away from the centre of the reflector and, therefore, less of the beam is being reflected—the next movement of the beam will be in the opposite direction. By way of additional explanation, FIG. 4 also shows graphically an optimum signal 43, being a mid-point in the dynamic range 40 between minimum signal 42 and maximum signal 41, and also defines zero signal 44 and saturation 45, all in relation to increasing signal strength 46.

If the signal appears constant or does not change appreciably for a number of movements in a row in both lateral and altitudinal axes, then the adjustment procedure has completed. It should be noted that the outcome of adjust is fairly good alignment of the beam to the middle of the reflector, with the appropriate transmitter power and receiver gain selected for the distance between transmitter, reflector and receiver—but it is still not guaranteed that the beam is exactly on the centre of the reflector, as exemplified in FIG. 3f.

Once 'adjust' has completed, 'centre' can begin. FIGS. 5a to 5i graphically represent a centering procedure implemented by the algorithm. In summary, this procedure has two purposes:
- to align the centre of the beam 10 exactly with the centre of the reflector 20—which seeks to ensure continued stable operation throughout the life of the smoke detector; and
- to perform a final check that the IR beam 10 is on the reflector 20 and not some other reflective surface—which forms a useful cross-reference as a detector can struggle to distinguish light returned from the reflector 20 from light returned from some other reflective surface (not shown) in the beam path.

The centering procedure profiles the shape of the reflective surface of the reflector 20 by deliberately steering the IR beam 10 away from the centre, by locating a number of edges of the reflector. The beam 10 is caused to move in both lateral and altitudinal axes, whilst monitoring the signal strength and position. Starting from its position shown in FIG. 5a, in which adjust has recently completed and the beam 10 is in fairly good alignment with the middle of the reflector 20—but it should be noted that the centre of the beam 10 is not actually aligned with the centre of the reflector 20—a series of one or more incremental altitudinal movements are undertaken so as to move the beam 10 from its position shown in FIG. 5a to its position shown in FIG. 5b. Specifically, the beam 10 moves upwards with respect to the static reflector 20, and through a slight corresponding signal drop at the position shown in FIG. 5b, finds a lower edge 51 of the reflective surface of the reflector 20. The signal drop is, or course, expected as (somewhat) less of the reflective surface of the reflector 20 is illuminated by the beam 10. As the beam 10 continues to move upwards with respect to the reflector 20—and travels from the position shown in FIG. 5b to that of FIG. 5c—a further and more marked corresponding loss of signal confirms that the edge 51 of the reflector had been previously located (position of FIG. 5b). The same procedure is then undertaken to find the an upper edge 52 of the reflector 20, and the beam 10 moves downwards with respect to the static reflector 20, through the positions shown in FIG. 5d (which corresponds to FIG. 5b) and FIG. 5e (which corresponds to FIG. 5a) until it reaches an upper edge 52 of the reflector 20, as shown in FIG. 5f. In the same manner as described in relation to finding the lower edge 51, after the upper edge 52 has been initially located, subsequent downward movement of the beam 10 confirms the previous finding through a more marked signal loss, which would be expected in the position shown in FIG. 5f. By counting and monitoring the number of incremental movements made by the beam 10 to cross the reflector from the lower edge 51 to the upper edge 52, the middle will, of course, correspond to half of that total and, so, the beam is subsequently moved through the position shown in FIG. 5h (which corresponds to FIG. 5f) to that shown in FIG. 5i, in which a centre of the beam 10 is in direct alignment with/on a centre of the reflector 20, which corresponding centres are identified by reference 50.

Although centering has been described only in relation to the altitudinal axis of the reflector, the same procedure is followed in the lateral axis.

This form of profiling should result in an equal number of movements in both axes when on a reflector as the reflector is symmetrical. As a result, surfaces that are not symmetrical and/or are larger than expected—those which might potentially be some other reflective surface and not the reflector per se—will be detected and the alignment terminated with a user indication to that effect.

Following 'centre', the reflective-type smoke detector is now ready for use, during which projection of the beam 10 is typically reduced to about once per second.

Whilst the invention has been described in relation to an IR beam and an IR smoke detector, it is equally applicable to alignment of other forms of electromagnetic beam, for instance Ultraviolet (UV), in a UV smoke detector.

Although the size of the incremental movement(s) has not been defined, it will be understood that incremental movements are, normally, movements of the same size.

Those skilled in the art will understand that the method of the centering procedure described above can be used to determine a shape or profile of the reflector without determining a centre thereof.

What is claimed is:
1. A method for auto-aligning a projected optical beam transmitted by an optical source onto a reflector in a reflective-type optical beam detector, the method comprising:
  (a) projecting a flat and wide optical beam providing illumination of a size larger than a reflective surface of the reflector;
  (b) adjusting the projected beam so as to project onto all of the reflective surface of the reflector;
  (c) detecting one or more edges of the reflective surface of the reflector, and
  wherein the method further comprising one or more of:
  (i) centering the projected beam while fully illuminating the reflective surface of the reflector, so as to align an approximate center of the projected beam on, or within a predetermined threshold of, an approximate center of the reflective surface of the reflector; and (ii) determining a shape or profile of the reflector.

2. The method as claimed in claim 1, wherein, prior to the step of adjusting the method comprises conducting visual targeting of the reflector.

3. The method as claimed in claim 1 further comprising projecting the beam to a first projected location in a vicinity of the reflector and, if no signal is detected from the reflector or a signal detected is less than an operable threshold, projecting the beam either constantly or intermittently while tracing at least part of a circumjacent pathway around the first projected location in order to detect a location of the reflector.

4. The method as claimed in claim 1, wherein adjusting additionally comprises adjusting transmitter power and receiver gain.

5. The method as claimed in claim 1, wherein the steps of adjusting or detecting each comprises a series of one or more incremental movements of the projected beam in one or more of altitudinal and lateral directions.

6. The method as claimed in claim 5 additionally comprising, during adjusting or detecting, monitoring a signal received from the reflector after each incremental movement.

7. The method as claimed in claim 1, wherein the step of centering comprises calculating a number of incremental movements from one edge of the reflector to an opposed edge of the reflector and determining a median.

8. The method as claimed in claim 1, wherein the reflective-type beam detector is configured to be an optical beam smoke detector.

9. The method as claimed in claim 3, wherein the circumjacent pathway incrementally increases in size after each full trace around the first projected location.

10. The method as claimed in claim 3, further comprising, while tracing:
if a signal is detected or any signal detected meets the operable threshold at a subsequently projected location, terminating the search as the reflector has been located; or
if no signal is detected from the reflector or any signal detected is less than an operable threshold at a subsequently projected location, the method further comprises one or more of (i) continuing tracing the circumjacent pathway, and (ii) increasing a size of the circumjacent pathway.

11. The method as claimed in claim 3, wherein, the method comprises one or more of projecting the beam to:
(i) a second projected location at a distance x from the first projected location, from which second projected location a first circumjacent pathway starts;
(ii) a third projected location at a distance y, where y>x, from the first projected location, from which third projected location a second circumjacent pathway starts; and
(iii) a fourth projected location at a distance z, where z>y>x, from the first projected location, from which fourth projected location a third circumjacent pathway starts.

12. The method as claimed in claim 11, wherein distances x and y, y and z, or x, y and z have a linear relationship.

13. The method as claimed in claim 3, wherein the search is terminated if no signal is detected from the reflector or a signal detected is less than the operable threshold, after three full traces around the projected location.

14. The method as claimed in claim 3, wherein the circumjacent pathway is circumferential, quadrilateral, or box-like.

15. A non-transitory data carrier, disk, chip, computer, or tablet having software programmed to implement the method of claim 1.

16. A beam detector apparatus, for auto-aligning a projected optical beam transmitted by an optical source onto a reflector, the beam detector apparatus configured to project a flat and wide optical beam capable of providing illumination of a size larger than a reflective surface of the reflector, the beam detector apparatus comprising:
(a) an adjusting apparatus for adjusting the projected beam so as to project onto all of the reflective surface of the reflector;
(b) a detecting apparatus for detecting one or more edges of the reflective surface of the reflector; and
wherein the beam detector apparatus further comprises one or more of:
(i) an apparatus configured to center the projected beam while fully illuminating the reflective surface of the reflector so as to align an approximate center of the projected beam on, or within a predetermined threshold of, an approximate center of the reflective surface of the reflector; and
(ii) an apparatus configured to determine a shape or profile of the reflector.

17. The apparatus as claimed in claim 16, the apparatus being configured to project the beam to a first projected location in a vicinity of the reflector and, if no signal is detected from the reflector or a signal detected is less than an operable threshold, project the beam either constantly or intermittently while tracing at least part of a circumjacent pathway around the first projected location in order to detect a location of the reflector, wherein the beam detector apparatus is configured to incrementally increase the circumjacent pathway in size after each full trace around the first projected location.

* * * * *

UNITED STATES PATENT AND TRADEMARK OFFICE
CERTIFICATE OF CORRECTION

Page 1 of 1

PATENT NO.          : 10,365,161 B2
APPLICATION NO.     : 15/624088
DATED               : July 30, 2019
INVENTOR(S)         : Jacob Andelin et al.

It is certified that error appears in the above-identified patent and that said Letters Patent is hereby corrected as shown below:

On the Title Page

After (22) insert the following text:
--Foreign Application Priority Data
June 16, 2016 (GB) 1610488.7--

Signed and Sealed this
Fifteenth Day of October, 2019

Andrei Iancu
*Director of the United States Patent and Trademark Office*